United States Patent Office 3,442,932
Patented May 6, 1969

---

3,442,932
CARBAMIC ACID (FLUOROACETAMIDO-TRICHLORO)ETHYL ESTERS
Christa Fest, Wuppertal-Elberfeld, and Günther Hermann, Leverkusen, Germany, assignors to Farbenfabriken Bayer Aktiengesellschaft, Leverkusen, Germany, a corporation of Germany
No Drawing. Filed Oct. 20, 1965, Ser. No. 499,068
Claims priority, application Germany, Oct. 29, 1964, F 44,337
Int. Cl. C07c 125/06
U.S. Cl. 260—472        11 Claims

ABSTRACT OF THE DISCLOSURE

Carbamic acid-1-(fluoroacetamido-2,2,2-trichloro)ethyl esters which possess selective rodenticidal properties for combating short-tailed mice.

---

The present invention relates to particular new carbamic acid esters, which have rodenticidal properties, to their compositions with carrier vehicles, and to the production and use thereof.

It is known that sodium monofluoroacetate, monofluoroacetamide, 1,2,3,4,10,10-hexachloro-exo-6,7-epoxy-1,4,4a,5,6,7,8,8a - octahydro - 1,4,5,8 - endo,endo - dimethane-naphthalene, chlorinated camphene and 2-chloro-4-methyl-6-dimethylaminopyrimidine can be used for combating short-tailed mice. These rodenticidal agents have already attained considerable practical importance. All these active compounds have, in common, the fact that they are not only active against short-tailed mice but also highly toxic towards other animals. Combating short-tailed mice with these active compounds thus also endangers domestic mammals, such as dogs and cats, as well as birds.

It is an object of the present invention to provide particular new carbamic acid esters which possess valuable rodenticidal, especially selective rodenticidal, properties, to provide active compositions in the form of mixtures of such esters with liquid and solid dispersible carrier vehicles, to provide processes for producing such compounds and to provide methods of using such compounds in a new way, especially for combating rodents, and in particular short-tailed mice.

Other and further objects of the present invention will become apparent from a study of the within specification and accompanying examples.

It has been found in accordance with the present invention that carbamic acid-1-(fluoroacetamido-2,2,2-trichloro)ethyl esters having the general formula

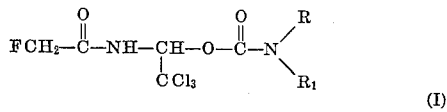

(I)

in which R is selected from the group consisting of hydrogen, lower alkyl, aryl having 6 to 10 ring carbon atoms, which alkyl and aryl may be substituted with at least one member selected from the group consisting of lower alkoxy, halo, nitro, cyano, and mixtures thereof, R' is selected from the group consisting of lower alkyl, aryl having 6 to 10 ring carbon atoms, which alkyl and aryl may be substituted with at least one member selected from the group consisting of lower alkoxy, halo, nitro, cyano, and mixtures thereof, R and R' taken togther with the nitrogen atom to which they are attached forming a heterocyclic ring having 5 to 6 ring members, have strong selective rodenticidal properties and can be used for combating short-tailed mice.

It has been further found in accordance with the present invention that the particular new carbamic acid esters of general Formula I above are obtained, when (a) chloral-fluoroacetamide of the formula:

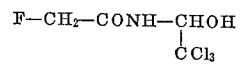

(II)

is reacted with isocyanates of the general formula:

(III)

in which R' has the same meaning as defined above, or (b) chloral-fluoroacetamide of Formula II above is reacted with carbamic acid chlorides of the general formula:

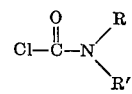

(IV)

in which R and R' have the same meaning as defined above.

All of the above-mentioned starting materials are known compounds as will be appreciated by the artisan.

It is very surprising that, in contrast to the previously known rodenticidal agents, the particular new carbamic acid esters according to the present invention have a high toxicity towards short-tailed mice but have only a very slight toxicity towards other animals, for example, towards other rodents, such as white mice and white rats.

Reaction (a) can be illustrated by the following equation when chloral-fluoroacetamide and methyl isocyanate are used as starting materials:

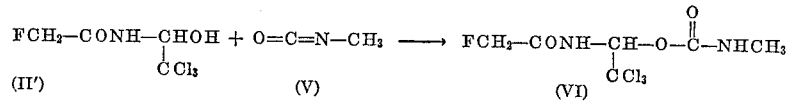

This reaction can be carried out in inert solvents, for example, hydrocarbons, such as benzine and benzene, chlorinated hydrocarbons, especially methylene chloride, and also ethers, such as dioxan, and the like. The reaction is accelerated conveniently by the addition of a tertiary amine, such as triethylamine. The reaction temperature may be varied within a fairly wide range. In general, the operation is carried out at a temperature substantially between about 0 and 100° C.

Reaction (b) can be illustrated by the following equation when chloral-fluoroacetamide and dimethyl-carbamic acid chloride are used as starting materials:

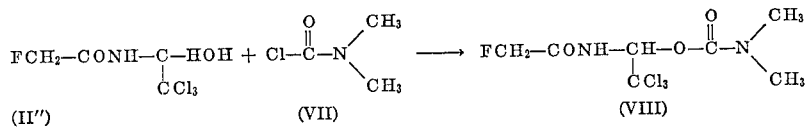

This reaction is expediently carried out in the presence of organic solvents, such as aromatic and aliphatic hydrocarbons, but mainly ethers, such as dioxan, or ketones, such as dimethyl ketone, and the like. The hydrochloric acid which is liberated is expediently neutralized by organic or inorganic acid-binding agents. Tertiary amines, such as diethylaniline and pyridine, and alkali metal hydroxides or alkali metal carbonates, and the like, can be used for this purpose, the acid-binding agents being added in equivalent amounts. The reaction temperature may be varied within a fairly wide range but is preferably substantially between about 0 and 50° C.

Advantageously, the compounds according to the present invention have selective rodenticidal properties and are, therefore, eminently suitable for combating noxious short-tailed mice (Microtinae). These include, for example, the common vole (*Mirotus arvalis*), the field vole (*Microtus agrestis*), the water vole (*Arvicola terrestris*) and the muskrat (*Ondatra zibethica*).

Thus, the new compounds of the instant invention can be used as rodenticides either alone or in admixture with solid or liquid carriers or diluents.

The active compounds according to the instant invention can be utilized, if desired, in the form of the usual formations or composition with dispersible carrier vehicles, such as solutions, emulsions, suspensions, emulsifiable concentrates, spray powders, pastes, soluble powders, dusting agent, granulates, etc. These are prepared in known manner, for instance by extending the active agents with dispersible liquid diluent carriers and/or dispersible solid carriers optionally with the use of carrier vehicle assistants including emulsifying agents and/or dispersing agents, whereby, for example, in the case where water is used as diluent, organic solvents may be added as auxiliary solvents (cf. Agricultural Chemicals, March 1960, pages 35–38). The following may be chiefly considered for use as carrier vehicles for this purpose: dispersible liquid diluent carriers, such as aromatic hydrocarbons (for instance, benzene, toluene, xylene, etc.), halogenated, especially chlorinated, aromatic hydrocarbons (for instance, chlorobenzenes), paraffins (for instance, petroleum fractions), chlorinated aliphatic hydrocarbons (for instance, methylene chloride, etc.), alcohols (for instance methanol, ethanol, propanol, butanol, etc.), amines (for instance, ethanolamine, etc.), amides (for instance, dimethyl formamide, etc.), ketones (for instance, acetone, etc.), and water; as well as dispersible finely divided solid carriers, such as natural ground minerals (for instance, kaolins, alumina, silica, chalk, i.e., calcium carbonate, talc, kieselguhr, etc.), and synthetic ground minerals (for instance, highly dispersed silicic acid, silicates, e.g., alkali silicates, etc.); whereas the following may be chiefly considered for use as carrier vehicle assistants for this purpose: emulsifying agents, such as nonionic and anionic emulsifying agents (for instance, polyethylene oxide esters of fatty acids, polyethylene oxide ethers of fatty alcohols, alkyl sulfonates, aryl sulfonates, etc., and especially alkyl aryl-polyglycol ethers, magnesium stearate, sodium oleate, etc.); and dispersing agents, such as lignin, sulfite waste liquors, methyl cellulose, etc.

As will be appreciated by the artisan, the active compounds according to the instant invention may be present in such formulations or compositions in the form of mixtures with one another and with other known active substances, if desired.

The substances according to the invention may be employed by themselves as the artisan will appreciate, in the form of their compositions with solid or liquid dispersible carrier vehicles or other known compatible active agents, or in the form of particular dosage preparations for specific application made therefrom, such as solutions, emulsions, suspensions, powders, pastes, and granulates which are thus ready for use.

As concerns commercially marketed preparations, these generally contemplate carrier composition mixtures in which the active compound is present in an amount substantially between about 0.1–95% by weight, and preferably 0.5–90% by weight of the mixture, whereas carrier composition mixtures suitable for direct application or field application generally contemplate those in which the active compound is present in an amount substantially between about 0.002 and 20%, preferably 0.01 and 5%, by weight of the mixture. Thus, the present invention contemplates overall compositions which comprise mixtures of a dispersible carrier vehicle such as a dispersible carrier solid, or a dispersible carrier liquid preferably including a carrier vehicle assistant such as an emulsifying agent and/or a dispersing agent, and an amount of the active compound which is effective for the purpose in question and which is generally between about 0.002 and 95% by weight of the mixture. Specifically, the active compound may be applied to a surface area to be treated for combating rodents in concentrations substantially between about 10 and 250 mg./sq. meter area.

Furthermore, the present invention contemplates methods of selectively controlling or combating undesired rodents, e.g., short-tailed mice, which comprise applying to at least one of (a) such mice and (b) their habitat, a rodenticidally effective amount of the particular active compound of the invention alone or together with a carrier vehicle as noted above. The instant formulations or compositions are applied in the usual manner, for example, by spraying, atomizing, vaporizing, scattering, dusting, watering, sprinkling, and the like, and particularly by poisoning drinking water or by disposing, above ground or underground, eating or playing baits or rodent attractants in which the active compounds are incorporated and also by fumigating rooms or subterranean burrows.

The following examples are given for the purpose of illustrating, while not limiting, the utility of the particular new compounds according to the present invention.

Example 1.—Toxicity test/oral application

Test animal: Evaluation after (days)
  White laboratory mouse (*Mus. musculus*) _____ 3
  White laboratory rat (*Rattus norvegicus*) _____ 7
  Common vole (*Microtus arvalis*) _____ 3

To produce a suitable preparation of the active compound, 3 parts by weight of the particular active compound are mixed with 2.8 parts by weight of highly-dispersed silicic acid and 4.2 parts by weight of talc. From this concentrate of the given active compound, there are prepared, by triturating with water and adding some powdered vegetable gum, suspensions which contain, per ml. liquid, the amount of active compound to be applied per 100 g. animal weight. Measuring is carried out volumetrically, after weighing the test animals, application being per os by means of a knobbed steel probe. Evaluation is made after the periods of time specified above, calculated from the start of application of the given active compound.

The $LD_{50}$ values (dose of active compound by which 50% of the treated test animals are destroyed) are determined in the usual manner by the mortality values of the doses varied in geometrical progression.

The active compounds, $LD_{50}$ values and test animals are given in Table 1 as follows:

common voles are placed on the sod. The degree of destruction is determined percentagewise after 3 days.

The given active compound, the amount applied (mg./sq. m.) and the degree of destruction can be seen from the following Table 2:

TABLE 2.—POISONED AREA TEST

| Active compound | Percent destruction with quantities (mg./sq. m.) of— | | |
|---|---|---|---|
| | 100 | 50 | 20 |
| $FCH_2CONH-CH(CCl_3)-O-C(=O)-NHCH_3$ | 100 | 100 | 50 |

TABLE 1.—TOXICITY TEST/ORAL APPLICATION

| | Active compound | $LD_{50}$ values (mg./kg. body weight) | | |
|---|---|---|---|---|
| | | Albino rat | Albino mouse | Common vole |
| (A) | Sodium monofluoroacetate | *5–7 | *8–10 | 5 |
| (B) | Monofluoroacetamide | *15 | *6–10 | 15 |
| (C) | 1,2,3,4,10,10-hexachloro-exo-6,7-epoxy-1,4,4a,5,6,-7,8,8a-octahydro-1,4,5,8-endo,endo-dimethane-naphthalene | *7.3 | 8 | 8 |
| (D) | Chlorinated camphene | *90–125 | *112 | *90 |
| (E) | 2-chloro-4-methyl-6-dimethylaminopyrimidine | *1–2 | *1–2 | 2 |
| (VI′) | $FCH_2CONH-CH(CCl_3)-O-C(=O)-NHCH_3$ | 225 | 450 | 7.5 |
| (VIII′) | $FCH_2CONH-CH(CCl_3)-O-C(=O)-N(CH_3)_2$ | 40 | 300 | 2.5 |
| (IX) | $F\cdot CH_2\cdot CO-NH\cdot CH(CCl_3)\cdot O\cdot CO\cdot NH-C_6H_5$ | 150 | >1,200 | 7.5 |
| (X) | $FCH_2CO\cdot NH\cdot CH(CCl_3)\cdot O\cdot CO\cdot NH-C_6H_4-NO_2$ | 750 | >1,200 | 5 |
| (XI) | $FCH_2CO\cdot NH\cdot CH(CCl_3)\cdot O\cdot CO\cdot NH-C_6H_4-O\cdot C_2H_5$ | 600 | >1,200 | 10 |

*The figures in Table 1 marked with asterisks are taken from publications.

Example 2.—Poisoned area test

Test animal: common vole (*Microtus arvalis*)
Wettable powder base consisting of:
 3% sodium diisobutyl-naphthalene-1-sulphonate,
 6% sulphite waste liquor, partially condensed with aniline,
 40% highly dispersed silicic acid containing calcium oxide.
 51% colloidal kaolin.

To produce a suitable preparation of the particular active compound, 1 part by weight of such active compound is intimately mixed with 19 parts by weight of the wettable powder base. The spray powder thus obtained is suspended in water and the suspension diluted to the desired final concentration. 200 ml. of the suspension contain the amount of active compound to be applied per square metre.

20 ml. of the suspension of the given active compound are sprayed on a circular area of 1000 sq. cm. in which a 20 x 29 cm. sod is placed. Immediately afterwards, the sod is transferred to a wire metal cage and 4 mature Example 3.—Poisoned wheat test/mice Test animal: common vole (*Microtus arvalis*)
Solvent: acetone To produce a suitable preparation of the particular active compound, an amount of such active compound is dissolved in the solvent stated above sufficient to obtain the desired concentration of such active compound in wheat from 26.6 g. of this solution are carefully mixed with 1 kg. wheat seed and the solvent is allowed to evaporate.

Ten grains of the wheat thus treated are offered to each of 4 hungry test animals which are kept separately. An ample amount of water is also available. After 24 hours, the animals are again fed normally.

Within 7 days of application, the degree of destruction of the test animals is determined percentagewise, in relation to the period of time.

The given active compound, its concentration, the degree of destruction and the period of time required for destruction can be seen from the following Table 3:

TABLE 3.—POISONED WHEAT TEST/MICE

| Active compound | Concentration of active comp., percent | Degree of destruction, percent | Time required for destruction, days |
|---|---|---|---|
| (VI‴) $FCH_2CONH-CH(CCl_3)-O-C(=O)-NHCH_3$ | 0.25 | 100 | 1 |

The following examples are given for the purpose of illustrating, while not limiting, the preparation of new compounds according to the present invention:

Example 4

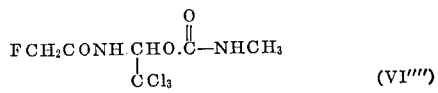
(VI'''')

112 grams (½ mol) of chloral-fluoroacetamide are suspended in 150 cc. of methylene chloride and such suspension is mixed at room temperature with 30 g. of methyl isocyanate. The chloral-fluoroacetamide dissolves after some hours and the corresponding carbamic acid ester precipitates after a few more hours. A further 30 g. of isocyanate are added to complete the reaction. The precipitated product is filtered off with suction and recrystallized from methylene chloride; M.P. 133° C. Yield 52 g. (37% of the theoretical).

Example 5

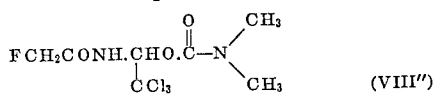
(VIII'')

67 grams (3/10 mol) of chloral-fluoroacetamide are dissolved in 200 cc. of ether. To the resulting solution 24 grams (3/10 mol) of pyridine are added and then 32 g. (3/10 mol) of dimethyl-carbamic acid chloride are added dropwise at 15–20° C. The reaction mixture is stirred at room temperature for 12 hours and filtered off with suction from the precipitated pyridine hydrochloride. The solvent is removed under vacuum. There remains an oil which slowly crystallizes; M.P. 105° C. Yield 10 g. (11% of the theoretical).

Example 6

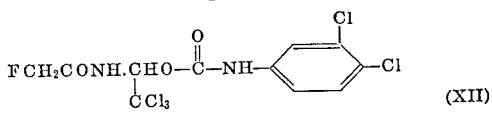
(XII)

67 grams (3/10 mol) of chloral-fluoroacetamide are suspended in 100 cc. of methylene chloride and the suspension is mixed at room temperature with 57 g. (3/10 mol) of 3,4-dichlorophenyl isocyanate dissolved in 50 cc. methylene chloride. Part of the reaction product dissolves but soon reprecipitates. The reaction mixture is further stirred for 10 hours and then filtered off with suction. Unreacted starting material can be removed by dissolving in alcohol. The reaction product is a white crystalline compound; M.P. 260° C. (decomposition). Yield 40 g. (32% of the theoretical).

Example 7

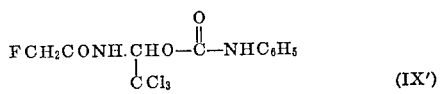
(IX')

44 grams (2/10 mol) of chloral-fluoroacetamide are suspended in 100 cc. of methylene chloride and the suspension is mixed at room temperature with 24 g. (2/10 mol) of phenyl isocyanate. The temperature rises by about 10° C. only after the addition of 3 drops of triethylamine. A clear solution is formed which is stirred at room temperature for one day. The solvent has to be evaporated only to a small extent in order that the reaction product crystallizes in the form of white needles; M.P. 107–108° C. (recrystallized from cyclohexane). Yield 18 g. (27% of the theoretical).

Example 8

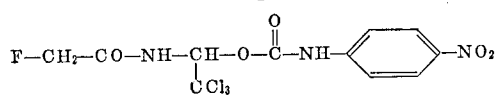
(X')

44 grams (2/10 mole) of chloro-fluoroacetamide are suspended in 100 cc. of methylene chloride and the suspension is mixed at room temperature with 33 g. (2/10 mol) of p-nitrophenyl isocyanate dissolved in a little methylene chloride. A few drops of triethylamine are added as catalyst. The reaction then proceeds very vigorously and cooling is necessary. The reaction mixture is allowed to stand for 24 hours and the solvent then removed under vacuum. The product is obtained as yellow crystals; M.P. 220° C. (decomposition). Yield 46 g. (59.4% of the theoretical).

Example 9

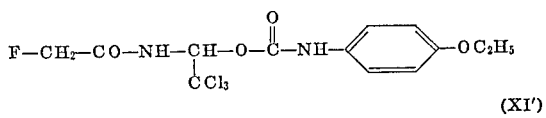
(XI')

44 grams (2/10 mol) of chloral-fluoroacetamide are suspended in 100 cc. of methylene chloride and the suspension mixed at room temperature with 33 g. (2/10 mol) of p-ethoxyphenyl isocyanate dissolved in methylene chloride and a few drops of triethylamine as catalyst, cooling being necessary. The reaction product soon precipitates and is obtained, after recrystallization from methanol, in the form of white needles; M.P. 141° C. Yield 37 g. (48% of the theoretical).

In accordance with the foregoing, Example 4 may be repeated using corresponding molar amounts of chloral-fluoroacetamide, methylene chloride, and each of the following isocyanates respectively:

Tert.-butyl-, naphthyl-, and 1-fluoromethyl-ethyl- (i.e., fluoroisopropyl) isocyanate, whereupon the corresponding tert.- butyl-, naphthyl-1- and 1-fluoromethyl-, -ethyl- carbamic acid-1-(1-fluoroacetamido-2,2,2-trichloro)ethyl ester is produced.

In the same way following the procedure of Example 5 using corresponding molar amounts of chloral-fluoroacetamide, ether, pyridine and each of the following carbamic acid chlorides respectively:

n-Butyl-(3-sec.-butoxyphenyl)-, 1-naphthyl-(2-chloroethyl)-, 4-sec.-butoxyphenyl-(3-chloro-4-bromo-phenyl)-, 2-chloroethyl-(cyanomethyl)-, 1-fluoromethyl-ethyl- (i.e., fluoroisopropyl), -3-sec.-butoxyphenyl-, 3-chloro-4-fluorophenyl-(4-cyanophenyl)-cyanomethyl-(2-chloroethyl)-, 4, 4'-dicyanophenyl-, piperidino-, and 3-chloropyrrolidino-, -carbamic acid chloride, whereupon the corresponding n-butyl - (3-sec.-butoxyphenyl)-, 1-naphthyl1 - (2-chloroethyl)-, 4-sec.-butoxyphenyl-(3-chloro-4-bromo-phenyl)-, 2-chloroethyl-(cyanomethyl)-, 1-fluoromethyl-ethyl-3-sec. -butoxyphenyl-, 3-chloro-4-fluorophenyl-4-cyanophenyl)-, cyanomethyl-(2-chloroethyl)- 4,4'-dicyanophenyl-, piperidino-, and 3-chloropyrrolidino-, -carbamic acid-1-(1-fluoroacetamido-2,2,2-trichloro)ethyl ester is produced.

Advantageously, in accordance with the present invention in the foregoing formulae:

R represents hydrogen; lower alkyl such as methyl, ethyl, n-propyl, isopropyl, n-butyl, isobutyl, sec.-butyl, tert.-butyl, and the like, preferably lower alkyl having 1 to 4 carbon atoms; aryl containing 6 to 10 ring carbon atoms such as phenyl, naphthyl, and the like, preferably phenyl;

R' represents lower alkyl such as methyl, ethyl, n-propyl, isopropyl, n-butyl, isobutyl, sec.-butyl, tert.-butyl, and the like, preferably lower alkyl having 1 to 4 carbon atoms; aryl containing 6 to 10 ring carbon atoms such as phenyl, naphthyl, and the like, preferably phenyl;

R and R' when taken together with the adjacent atom, representing a heterocyclic ring having 5 to 6 ring members such as piperidino, 2-chloro-4-methyl-piperidino, morpholino, 3-nitromorpholino, pyrrolidino, 3-chloropyrrilidino, and the like; with R and R' as noted hereinabove each contemplating substituents thereon including mono-, di- and poly-;

Lower alkoxy such as methoxy, ethoxy, n-propoxy, isopropoxy, n-butoxy, isobutoxy, sec.-butoxy, tert.-butoxy, and the like, preferably lower alkoxy having 1 to 4 carbon atoms; halo such as chloro, fluoro, bromo, and iodo, preferably chloro, fluoro, and bromo; nitro; cyano; and mixtures of mono-, di, and polylower alkoxy, halo, nitro and cyano groups.

Consonant with the foregoing, particular esters coming within the purview of the invention include lower alkyl carbamic acid-1-(1-fluoroacetamido-2,2,2-trichloro)ethyl esters having the general formula

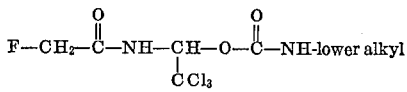

dilower alkyl carbamic acid-1-(1-fluoroactamido-2,2,2-trichloro)ethyl esters having the general formula

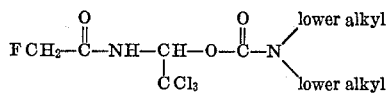

and phenyl carbamic acid-1(1-fluoroacetamido-2,2,2-trichloro)ethyl esters having the general formula

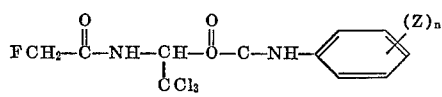

in which Z is selected from the group consisting of chloro, nitro, and lower alkoxy, and n is a number from 0 to 2.

It will be realized by the artisan that all of the foregoing ester compounds contemplated by the present invention possess the desired selective rodenticidal properties for combating short-tailed mice, and that such compounds have not only a very slight toxicity towards other animals of a domestic nature, such as dogs and cats, as well as birds, but also against commercially desirable rodents such as white mice and white rats which are typical research mammals of commercial value. Of course, by adjusting the concentration of the instant compounds when applied in accordance with the foregoing, the selective lethal dosage for short-tailed mice may be achieved without endangering other valuable domestic mammals and birds such as those mentioned hereinabove.

It will be appreciated that the instant specification and examples are set forth by way of illustration and not limitation, and that various modifications and changes may be made without departing from the spirit and scope of the present invention which is to be limited only by the scope of the appended claims.

What is claimed is:

1. Carbamic acid - 1 - (1 - fluoroacetamido - 2,2,2,-trichloro)ethyl esters having the general formula

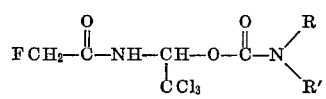

in which R is selected from the group consisting of hydrogen, lower alkyl, aryl having 6 to 10 ring carbon atoms, which alkyl and aryl may be substituted with at least one member selected from the group consisting of lower alkoxy, halo, nitro, cyano, and mixtures thereof, R' is selected from the group consisting of lower alkyl, aryl having 6 to 10 ring carbon atoms, which alkyl and aryl may be substituted with at least one member selected from the group consisting of lower alkoxy, halo, nitro, cyano, and mixtures thereof, R and R' when taken together with the nitrogen atom to which they are attached forming a heterocyclic ring having 5 to 6 ring members selected from the group consisting of pyrrolidino, morpholino and piperidino.

2. Carbamic acid - 1 - (1 - fluoroacetamido - 2,2,2,-trichloro)ethyl esters having the general formula

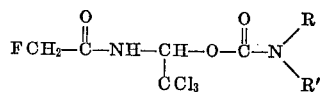

in which R is selected from the group consisting of hydrogen, lower alkyl having 1 to 4 carbon atoms, phenyl, which alkyl and phenyl may be substituted with at least one member selected from the group consisting of lower alkoxy having 1 to 4 carbon atoms, chloro, fluoro, bromo, nitro, cyano, and mixtures thereof, R' is selected from the group consisting of lower alkyl having 1 to 4 carbon atoms, phenyl, which alkyl and phenyl may be substituted with at least one member selected from the group consisting of lower alkoxy having 1 to 4 carbon atoms, chloro, fluoro, bromo, nitro, cyano, and mixtures thereof, R and R' when taken together with the nitrogen atom to which they are attached forming a heterocyclic ring having 5 to 6 ring members selected from the group consisting of pyrrolidino, morpholino and piperidino.

3. Lower alkyl carbamic acid - 1 - (1 - fluoroacetamido-2,2,2,-trichloro)ethyl esters having the general formula

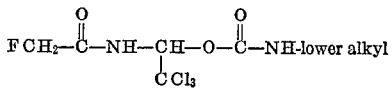

4. Dilower alkyl carbamic acid-1-(1-fluoroacetamido-2,2,2-trichloro)ethyl esters having the general formula

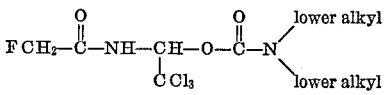

5. Phenyl carbamic acid - 1 - (1 - fluoroacetamido-2,2,2-trichloro)ethyl esters having the general formula

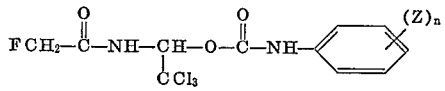

in which Z is selected from the group consisting of chloro, nitro, and lower alkoxy, and n is a number from 0 to 2.

6. Monomethyl carbamic acid - 1 - (1 - fluoroacetamido-2,2,2-trichloro)ethyl ester having the formula

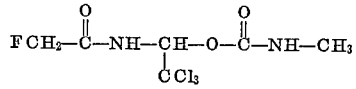

7. Dimethyl carbamic acid-1-(1-fluoroacetamido-2,2,2-trichloro)ethyl ester having the formula

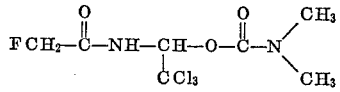

8. 3,4-dichlorophenyl carbamic acid-1-(1-fluoroacetamido-2,2,2-trichloro)ethyl ester having the formula

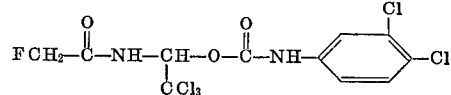

9. Phenyl carbamic acid-1-(1-fluoroacetamido-2,2,2-trichloro)ethyl ester having the formula

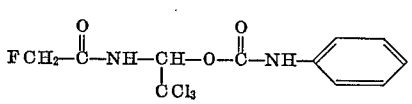

10. 4 - nitrophenyl carbamic - 1 - (1 - fluoroacetamido-2,2,2-trichloro)ethyl ester having the formula
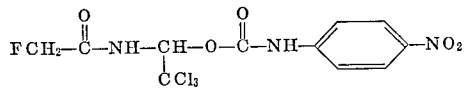
11. 4 - ethoxyphenyl carbamic acid - 1 - (1 - fluoroacetamido-2,2,2-trichloro)ethyl ester having the formula
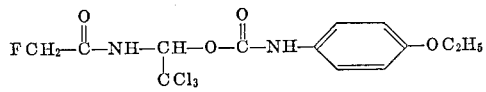
References Cited
UNITED STATES PATENTS
3,234,248   2/1966   Scherer et al. _____ 260—472
LORRAINE A. WEINBERGER, *Primary Examiner.*
A. THAXTON, *Assistant Examiner.*
U.S. Cl. X.R.
167—46; 260—247.2, 326.3, 294.3, 465, 465.4, 482